July 15, 1924.
C. A. TINCHER
1,501,473
SIRUP SPOUT CLOSURE
Filed Aug. 21, 1923
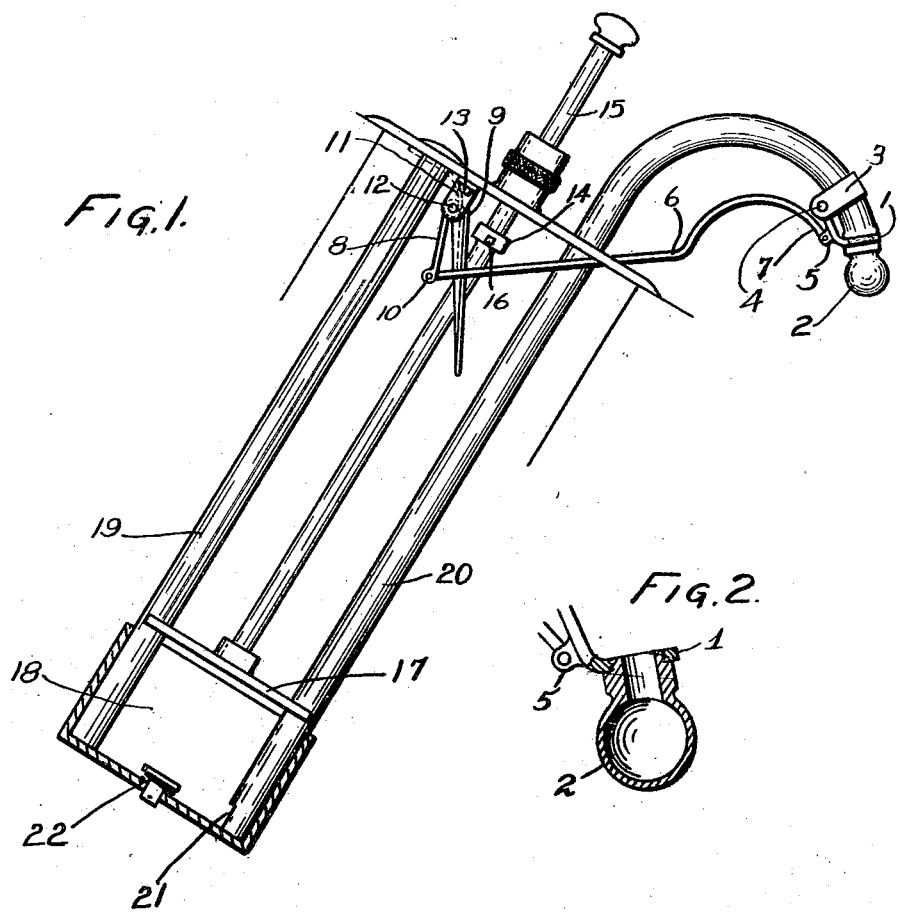
INVENTOR
Chester A. Tincher
Harry Bowen
ATTORNEY Patented July 15, 1924.

1,501,473

UNITED STATES PATENT OFFICE.

CHESTER A. TINCHER, OF SEATTLE, WASHINGTON.

SIRUP-SPOUT CLOSURE.

Application filed August 21, 1923. Serial No. 658,573.

*To all whom it may concern:*

Be it known that I, CHESTER A. TINCHER, a citizen of the United States, residing at Seattle, in the county of King and State of Washington, have invented a new and useful Sirup-Spout Closure; and I do hereby declare that the following is a full, clear, and exact specification, such as will enable others skilled in the art to which it appertains to make and use the same.

The invention is a cover for the ends of soda fountain spouts which will automatically move away from the spout as the plunger is pushed downward.

The object of the invention is to provide a means for closing the end of a soda fountain spout.

Another object of the invention is the providing of a means for automatically opening the closure, as the plunger which forces sirup out of the spout, is pushed downward.

And a further object of the invention is to provide a closure for the sirup spouts of soda fountains, which may be attached to any type of a spout.

With these ends in view the invention embodies a small cover hinged to the end of the spout, which has a rod connecting it to a lever that may be operated by a collar on the plunger.

Other features and advantages of the invention will appear from the following description taken in connection with the drawing, wherein:—

Fig. 1 shows a part of a section through a soda fountain sirup container.

Fig. 2 shows a cross-section through the cover.

The closure 1 which has a removable knob 2 having a reservoir in it, screwed into it, is pivotally attached to the end of the spout by placing a collar 3 around the spout and holding it in place by a pin 4 upon which the closure 1 is also pivoted. The knob 2 will catch the drip from the spout and it may be cleaned by unscrewing it from the cover 1. An ear 5 is placed on the rear of the closure to which a rod 6 is pivotally connected by a pin 7, and the opposite end of the rod 6 is pivotally attached to an arm 8 of the operating lever 9 by a pin 10. The lever 9 is pivotally attached to a clip 11 which may be placed on the under side of the sirup container cover and held by a bolt 13. The lever 9 may project outward as shown when in the normal position so that it may be engaged by a collar 14 which may be placed on the plunger 15 and held by a set-screw 16.

It will be understood that changes may be made in the construction without departing from the spirit of the invention, one of which changes may be in the design of the closure 1, another may be in the means for attaching the closure to the spout, and still another may be in the means for operating the closure by the plunger.

The construction will be readily understood from the foregoing description. To use the device it may be installed as shown in the drawing with the clip 11 arranged so that the collar 14 will engage the lever 9 as soon as the plunger starts downward, and hold the lever in such a position that it will hold the closure open until it returns to the upper end of its upward movement. It will be observed that the plunger 15 has a piston 17 attached to its lower end which operates in a cylinder 18 and is held in position by a guide rod 19 on one side and a guide 20 on the other, which is tubular and has an opening 21 at its lower end so that the sirup may pass upward through it to the spout as the plunger is pushed downward. A check valve 22 is placed in the lower end of the cylinder which will permit sirup to flow into the cylinder as the plunger moves upward, and prevent its escaping out of the cylinder as the plunger moves downward, so that the sirup will be forced up through the spout. Although I have shown a device of this design, it is understood my closure may be placed on a similar device of any type. And it is further understood that the construction of my device is immaterial, in that the invention is the providing of a closure for soda fountain sirup spouts which will automatically move away from the end of the spout as the plunger is pushed downward.

Having thus fully described the invention what I claim as new and desire to obtain by Letters Patent, is:

1. A closure for sirup spouts having a plate pivotally attached to a collar adjacent the end of the spout, a rod pivotally attached to the plate, a lever attached to the opposite end of the rod, and a collar on the plunger that forces the sirup up through the spout, which will engage the lever and hold the closure open.

2. A closure for sirup spouts or the like embodying a cover for the end of the spout, a means for pivotally attaching the cover to the end of the spout, and a means for moving the cover away from the end of the spout as the plunger that forces sirup up through the spout is pushed downward, and a means for returning the cover to closed position.

3. A closure of the class described having an L-shaped cover pivotally attached to the end of a sirup spout, a lever pivotally mounted in a sirup container, a means for moving the lever as the plunger is moved downward, and a means for opening the cover as the lever is moved.

4. A closure for sirup container spouts having a lever pivotally mounted in the container in such a position that it may be engaged by a collar on the plunger of the container as the plunger moves downward, and a means for closing the end of the spout which is provided with a reservoir and is connected to the lever in such a manner that as the plunger moves downward the lever will move the cover away from the end of the spout.

CHESTER A. TINCHER.